United States Patent
Shu et al.

(10) Patent No.: US 12,519,361 B2
(45) Date of Patent: Jan. 6, 2026

(54) STATOR OF MOTOR AND MOTOR

(71) Applicant: Schaeffler Technologies AG & Co. KG, Herzogenaurach (DE)

(72) Inventors: Sen Shu, Shanghai (CN); Xiangyang Li, Shanghai (CN); Weijun Han, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 391 days.

(21) Appl. No.: 18/269,596

(22) PCT Filed: Dec. 28, 2020

(86) PCT No.: PCT/CN2020/140223
§ 371 (c)(1),
(2) Date: Jun. 26, 2023

(87) PCT Pub. No.: WO2022/140932
PCT Pub. Date: Jul. 7, 2022

(65) Prior Publication Data
US 2024/0063674 A1    Feb. 22, 2024

(51) Int. Cl.
*H02K 3/28* (2006.01)
(52) U.S. Cl.
CPC ..................... *H02K 3/28* (2013.01)
(58) Field of Classification Search
CPC ....................................................... H02K 3/28
See application file for complete search history.

(56) References Cited

U.S. PATENT DOCUMENTS

| | | | | |
|---|---|---|---|---|
| 6,894,417 B2 * | 5/2005 | Cai | ........................... | H02K 3/12 310/201 |
| 7,005,772 B1 | 2/2006 | Frederick et al. | | |
| 7,622,843 B2 * | 11/2009 | Cai | ........................... | H02K 3/28 310/179 |
| 11,837,929 B2 * | 12/2023 | Yang | ......................... | H02K 3/14 |
| 11,949,304 B2 * | 4/2024 | Yamamoto | ............... | H02K 3/28 |
| 2005/0206263 A1 | 9/2005 | Cai et al. | | |

FOREIGN PATENT DOCUMENTS

| | | |
|---|---|---|
| CN | 110011450 | 7/2019 |
| CN | 111245129 | 6/2020 |
| CN | 111446797 | 7/2020 |
| CN | 212114918 | 12/2020 |

\* cited by examiner

*Primary Examiner* — Alexander Talpalatski
(74) *Attorney, Agent, or Firm* — Volpe Koenig

(57) ABSTRACT

A stator including a stator core and a winding. A wire of the winding is continuously wound in a wave shape in the circumferential direction, a number of wound layers is 2N, a number of phases is S, a number of poles of each phase winding is 2P. The stator core is formed with 4×S×P slots; the winding per phase per pole includes two wire groups; each wire group has two wires wound in parallel in adjacent slots; the pitches of the wire groups during winding include a normal pitch and a jumper pitch; the normal pitch has alternate first and second pitches; the jumper pitch includes a third pitch and a fourth pitch; each wire group uses one jumper pitch after every P−1 normal pitches in a same layer; and the jumper pitch causes the two wires in a same wire group to be transposed in the circumferential winding direction.

20 Claims, 4 Drawing Sheets

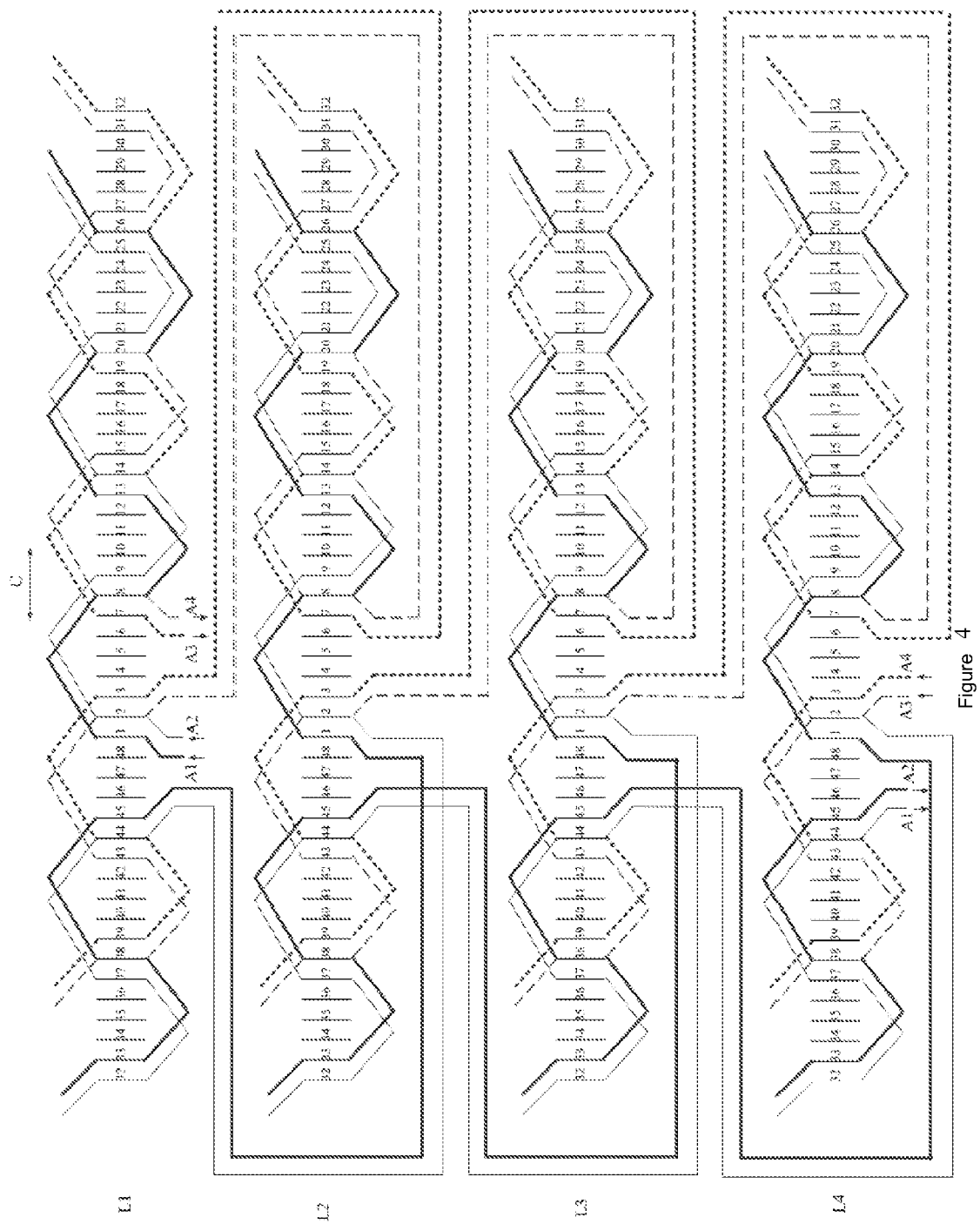

STATOR OF MOTOR AND MOTOR

CROSS-REFERENCE TO RELATED APPLICATION

This application is the U.S. National Phase of PCT Appln. No. PCT/CN2021/140223, filed Dec. 28, 2020, the entire disclosures of which is incorporated by reference herein.

TECHNICAL FIELD

The present disclosure relates to the field of motors, and in particular, to a stator of a motor and a motor.

BACKGROUND ART

Chinese patent with the publication No. CN111446797A discloses a flat wire continuous wave winding that is wound with dislocation and jumping at short pitch to cause the flat wires to form a continuous wave winding.

However, this winding method may cause, for multi-layer winding, uneven distribution of the windings in a circumferential direction of the stator core. For example, in the winding method shown in FIG. 2 disclosed therein, the wire A1 is wound through the slot 1 during the winding process of both the first layer and the second layer; and during the winding process of the third layer and the fourth layer, the wire A1 is not wound through the slot 1, but is wound through the slot 2. Therefore, the alternating current resistance of the first layer and the second layer is different from the alternating current resistance of the third layer and the fourth layer, resulting in copper loss and uneven heating.

SUMMARY

The present disclosure aims to overcome or at least ameliorate the foregoing disadvantages of the prior art, and provides a stator of a motor and a motor.

According to a first aspect of the present disclosure, a stator of a motor is provided, which includes a stator core and a stator winding. The stator winding includes a plurality of phase windings wound around the stator core. Wires of the windings are continuously wound in undulation in a circumferential direction of the stator core. The wires are wound for 2N layers, the number of phases of the windings is S, the number of poles of each phase winding is 2P, and N, S and P are positive integers, wherein 4×S×P slots are defined in the stator core, the winding of each pole of each phase comprises two wire groups, and each wire group comprises two wires wound in parallel in adjacent slots.

Pitches of each wire group during winding include a normal pitch and a jumper pitch. The normal pitch includes a first pitch and a second pitch which appear alternately, wherein the first pitch is y+1, and the second pitch is y−1. The jumper pitch includes a third pitch and a fourth pitch, wherein the third pitch is y, and the fourth pitch is y−2. y is a positive integer greater than 2.

For each wire group, one jumper pitch is used after every P−1 normal pitches in a same layer. The jumper pitch enables two wires in the same wire group to exchange sequence in a winding direction along the circumferential direction.

In at least one embodiment, for each wire group, one jumper pitch is used between two normal pitches at a junction of any adjacent layers except an Nth layer and an (N+1)th layer, so that the two wires in the same wire group exchange sequence in the winding direction along the circumferential direction.

In at least one embodiment, for each wire group, one jumper pitch is used between two normal pitches at a junction of any adjacent layers, so that the two wires in the same wire group exchange sequence in the winding direction along the circumferential direction.

In at least one embodiment, in the winding direction along the circumferential direction, the jumper pitch used by the wire in the slot which is the front one in the winding direction is the fourth pitch, and the jumper pitch used by the wire in the slot which is the rear one in the winding direction is the third pitch.

In at least one embodiment, y is equal to a pole pitch.

In at least one embodiment, the value S of the number of phases is equal to 3.

In at least one embodiment, the number of poles is 8, and P=4.

In at least one embodiment, the number of layers is 4, and N=2.

In at least one embodiment, each wire is an intact wire with no intermediate connection point in a winding path.

In at least one embodiment, the wires are flat wires.

According to a second aspect of the present disclosure, a motor is provided, which includes a stator, wherein the stator is the stator according to the present disclosure.

The stator of the motor according to the present disclosure has uniform windings, so that the magnetic potential has fewer harmonic components, and the alternating current resistances are balanced.

The stator and the motor according to the prevent disclosure have high reliability and can provide a higher power density compared to the prior art.

BRIEF DESCRIPTION OF THE DRAWINGS

FIG. 4 shows a schematic diagram of a winding method of one phase winding according to another embodiment of the present disclosure.

DESCRIPTION OF REFERENCE NUMERALS

C circumferential direction; L1 first layer; L2 second layer; L3 third layer; L4 fourth layer.

DETAILED DESCRIPTION

Exemplary embodiments of the present disclosure will be described below with reference to the attached drawings. It should be understood that these specific descriptions are only used to teach those skilled in the art how to implement the present disclosure, and are neither intended to be exhaustive of all possible variations of the present disclosure nor to limit the scope of the present disclosure.

Taking a three-phase motor (that is, the number of phases S=3) as an example, a motor and a stator of a motor according to the present disclosure are described with reference to FIGS. 1 to 4.

The stator includes a stator core and a stator winding. In this embodiment, 48 slots are defined in the stator core, and the figures show the 48 slots unfolded in a circumferential direction C. The number of poles 2P formed by the stator winding is 8, that is, the number of pole pairs P=4. The corresponding number of slots per phase per pole is 2.

According to the basic knowledge of windings, a corresponding pole pitch of the above winding y=6. According to the present disclosure, the winding is wound by a short-pitch method, so that some pitches used in certain areas are shorter than the pole pitch. Moreover, during the winding process, the winding method of combining the normal pitch with the jumper pitch is used, so that the wires are evenly distributed among the layers and the magnetic potential has fewer harmonic components.

Figure 1:
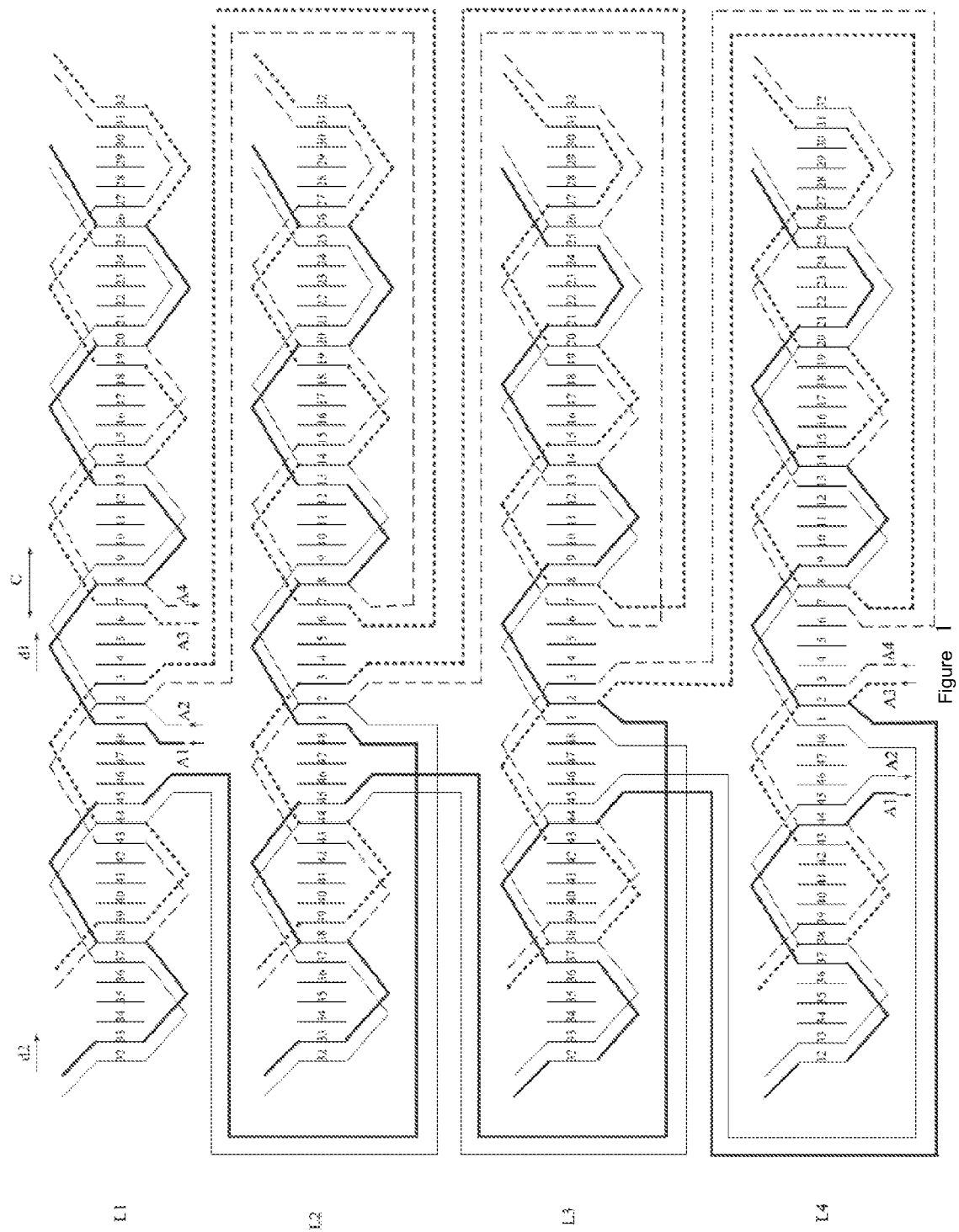
FIGS. 1 to 3 show schematic diagrams of winding methods of three phase windings according to an embodiment of the present disclosure respectively.
Figure 2:
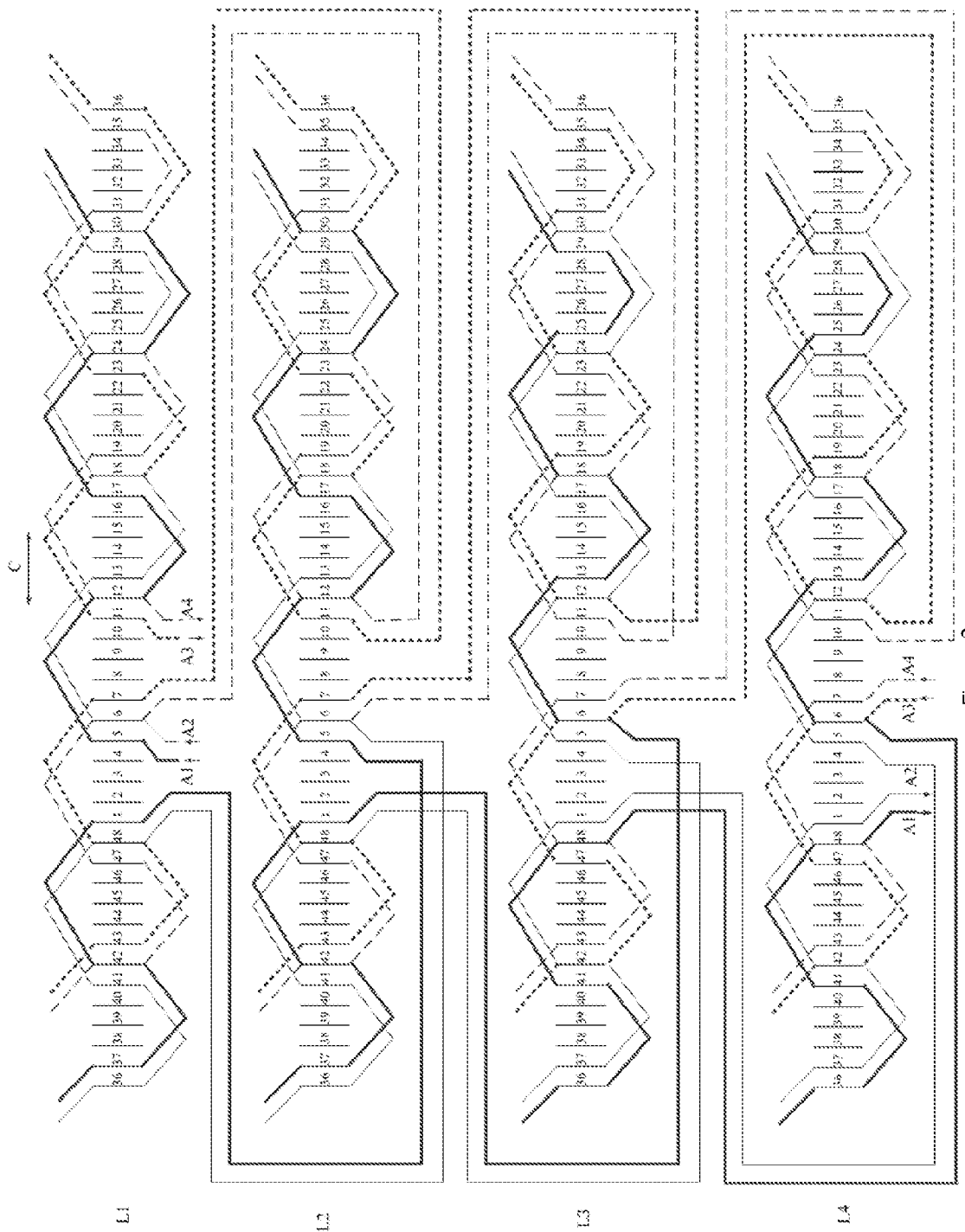
Figure 3:
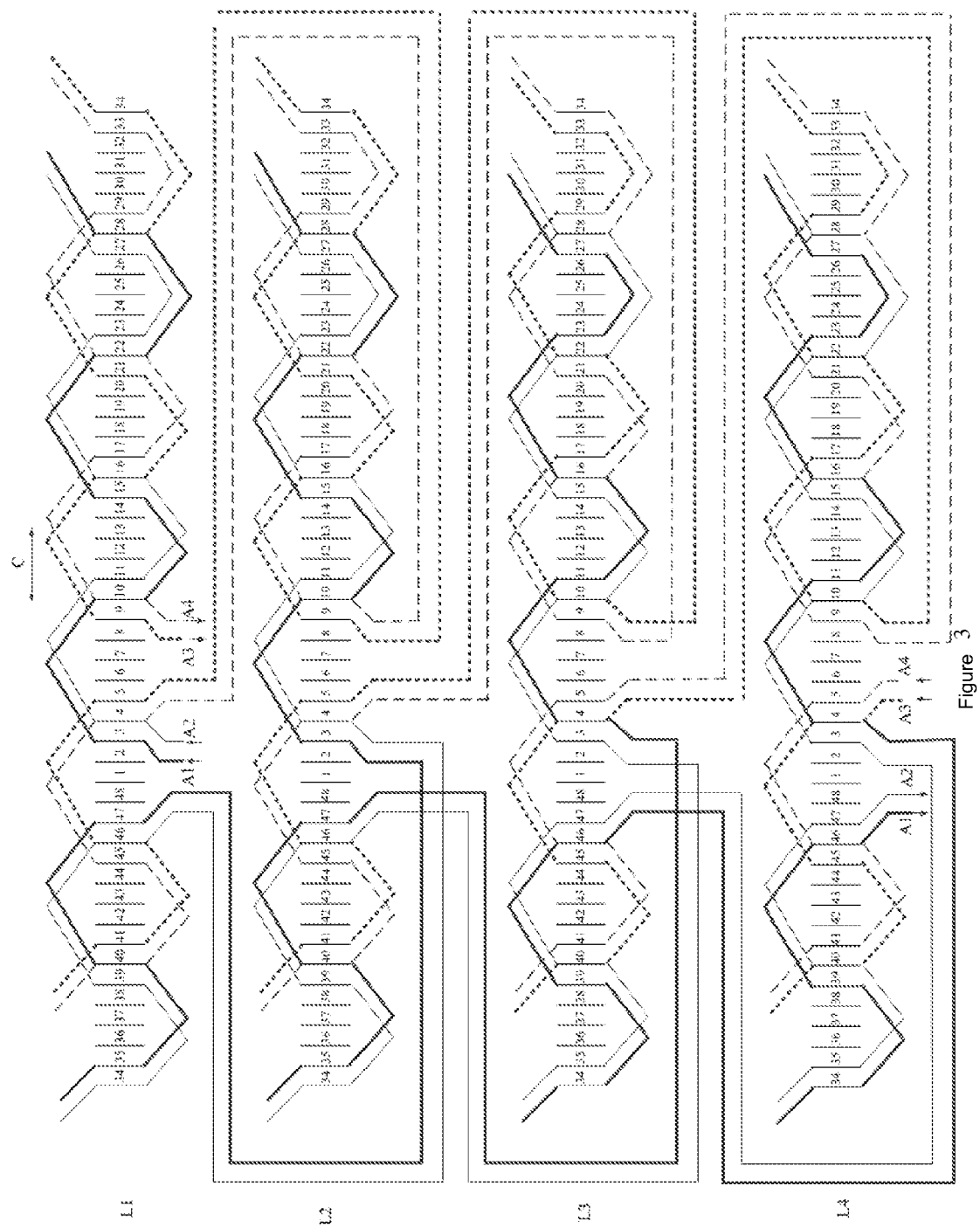

FIGS. 1 to 3 show schematic diagrams of winding methods of the phase windings (U-phase, V-phase and W-phase) according to an embodiment of the present disclosure respectively. Each phase winding includes four wires. The four wires form two wire groups, and each wire group includes two wires. The currents in each wire group flow in a same direction, and the currents in the two wire groups of each phase flow in opposite directions. Arrows below the wires in the figures show the flow directions of the currents in the wires. The winding rule for each phase winding is the same, the only difference being that initial winding slots for each phase winding are different, so that different slots are used by different phase windings.

Referring to FIG. 1, taking one phase winding (such as the U-phase winding) as an example, the winding rule of the windings according to the present disclosure is described.

FIG. 1 is a schematic diagram showing 48 slots, unfolded along the circumferential direction C of the stator core. A vertical line next to each serial number represents a slot. For convenience of description, the slot at the unfolded position is showed twice respectively at the beginning and the end of the unfolded diagram (that is, showed twice).

In this embodiment, the wires of each phase are wound in a radial direction of the stator core for four layers, which are the first layer L1, the second layer L2, the third layer L3 and the fourth layer L4. It should be noted that two groups of wires (corresponding to the wires represented by both the solid line and the dotted line in each slot in the figure) need to be provided for the reverse flow of currents in each layer. Therefore, in fact, each layer further includes two wire layers, that is, eight wires are stacked radially in each slot in this embodiment. For convenience of description, the eight wires are divided into the above four wire layers herein.

In the figure, the wire A1 and the wire A2 form one wire group, and the wire A3 and the wire A4 form the other wire group. The two wires in each wire group are wound in parallel in adjacent slots during each step of the winding process. Since the winding rules of the two wire groups are the same, the wire group formed by the wire A1 and the wire A2 is taken as an example for description.

Observing from the first layer L1, the wire A1 and the wire A2 respectively start from the slot 1 and the slot 2, and advance in the circumferential direction C of the stator core as indicated by the arrow d1. After the rightmost slot 32 in the figure is reached, the observation is turned to the leftmost slot 32 in the figure, and the wire A1 and the wire A2 continue advancing in the circumferential direction C of the stator core as indicated by the arrow d2. After the wires are wound in the circumferential direction C of the stator core for a full circle, the wires continue to wind in the second layer L2. Then, the above observation method is further used to observe the advancing direction of the wires in the subsequent layer.

Pitches of the wires during the winding process include a normal pitch and a jumper pitch. In this embodiment, in each layer, one jumper pitch is used after every three normal pitches; and between adjacent layers, the jumper pitch is used at the step where the wire is directed from a previous layer into the next layer, that is, one jumper pitch is used between the normal pitch at the tail end of the previous layer and the normal pitch at the beginning end of the next layer.

Every time the jumper pitch is used, the two wires in one wire group exchange sequence in the winding direction along the circumferential direction C, that is, for example, before the jumper pitch is used, in the winding direction along the circumferential direction C (that is, the directions indicated by arrows d1 and d2 in the figure), the wires wound at normal pitches in each step in adjacent slots satisfy: after one jumper pitch, the wire A2 which is the former front one becomes the rear one, and the wire A1 which is the former rear one becomes the front one.

Specifically, the normal pitch includes a first pitch and a second pitch. In this embodiment, the pole pitch=6, the first pitch is 7 (that is, y+1), and the second pitch is 5 (that is, y−1).

The jumper pitch includes a third pitch and a fourth pitch. The third pitch is 6 (that is, y), and the fourth pitch is 4 (that is, y−2).

When the normal pitch is used, the first pitch and the second pitch are used alternately. When the jumper pitch is used, the front wire in the winding direction is wound at the fourth pitch, and the rear wire in the winding direction is wound at the third pitch, so that the front wire and the rear wire exchange sequence in the winding direction after the jumping winding.

The winding of the wire A1 and the wire A2 starting from the slot 1 and the slot 2 of the first layer is taken as an example for detailed description.

During the winding of the wire A1 in the first layer L1, the wire A1 is sequentially wound through the slots in the order of: 1→8→13→20→26→33→38→45, and the used pitches are: 7 (8−1), 5 (13−8), 7 (20−13), 6 (26−20), 7 (33−26), 5 (38−33), 7 (45-38), wherein the pitch of 6 is the jumper pitch (the third pitch) used in the layer.

After that, the wire A1 is wound from the slot 45 of the first layer L1 to the slot 1 of the second layer L2, and is further wound in the second layer L2. The wire A1 is sequentially wound through the slots in the order of: 45 (L1)→1 (L2)→8→13→20→26→33→38→45, and the used pitches are: 4, 7, 5, 7, 6, 7, 5, 7, wherein the pitch of 4 is the jumper pitch (the fourth pitch) used between the layers, and the pitch of 6 is the jumper pitch (the third pitch) used in the layer.

During the winding of the wire A2 in the first layer L1, the wire A2 is sequentially wound through the slots in the order of: 2→9→14→21→25→32→37→44, and the used pitches are: 7, 5, 7, 4, 7, 5, 7, wherein the pitch of 4 is the jumper pitch (the fourth pitch) used in the layer.

After that, the wire A2 is wound from the slot 44 of the first layer L1 to the slot 2 of the second layer L2, and is further wound in the second layer L2. The wire A2 is sequentially wound through the slots in the order of: 44 (L1)→2 (L2)→9→14→21→25→32→37→44, and the used pitches are: 6, 7, 5, 7, 4, 7, 5, 7, wherein the pitch of 4 is the jumper pitch (the fourth pitch) used in the layer, and the pitch of 6 is the jumper pitch (the third pitch) used between the layers.

It should be noted that, in this embodiment, for the winding with a total number of layers of 2N, the jumper pitch is not used at a junction between an Nth layer and an (N+1)th layer (or between the Nth layer and the (N+1)th layer). As shown in FIG. 1, N=2, and the jumper pitch is not used between the second layer L2 and the third layer L3.

For example, for the wire A1, when the wire A1 is wound from the slot 45 of the second layer L2 to the third layer L3, the jumper pitch is not used, and the normal pitch is used instead. Since the pitch used in the previous step before the slot 45 of the second layer L2 is the first pitch with a pitch value of 7 (from the slot 38 of the second layer L2 to the slot 45), the wire then enters the slot 2 of the third layer L3 at the second pitch of the normal pitch with a pitch value of 5.

After that, the previous rule of "using one jumper pitch after every three normal pitches" is followed in the third layer L3. One jumper pitch is still used between the third layer L3 and the fourth layer L4.

By using the winding method, the slots used in each layer by each wire group of the winding according to the present disclosure are fixed or the same. For example, for the wire group formed by the wire A1 and the wire A2, the slots through which the wire A1 and the wire A2 are wound in the four layers are always the slots: 1, 2, 8, 9, 13, 14, 20, 21, 25, 26, 32, 33, 37, 38, 44 and 45.

Further, each phase winding has the characteristics of fixed slots, so that the three phase windings according to the present disclosure can maintain uniform winding in the circumferential direction C, and the alternating current resistances formed by the windings are more balanced.

The winding methods of the V-phase winding and the W-phase winding shown in FIG. 2 and FIG. 3 are similar to the winding method of the U-phase winding, which are not described in detail herein.

Alternatively, referring to FIG. 4, in other possible embodiments, the jumper pitch may be used between the Nth layer and the (N+1)th layer, that is, the jumper pitch is used between every two adjacent layers. For the other two phase windings, the jumper pitch may also be used between every two adjacent layers, and the corresponding illustrations are omitted in the present disclosure.

Preferably, the wires of the windings according to the present disclosure are flat wires, more preferably flat copper wires. The filling rate of the slot can reach 60% or more by using the flat wire.

Preferably, each of the four wires of each phase according to the present disclosure is an intact wire with no splicing or welding spot in a winding path. Therefore, the reliability of the windings is enhanced, and winding failure caused by damage to the intermediate welding spot is not likely to occur. Moreover, in actual production, considering various reasons, it is also possible to use multiple wires which are connected end to end to form a longer wire.

In an embodiment, the four wires of each phase according to the present disclosure may be connected in series, in parallel or in series-parallel. The three phase windings may be connected into a delta or star shape.

It should be understood that in the case where two slots are provided for each pole of each phase, the number of poles of each phase, the number of slots of the stator core, and the number of layers of the winding (which needs to be an even number) are not limited by the present disclosure.

It should be understood that the present disclosure further provides a motor including the above stator.

Some of the beneficial effects of the above-mentioned embodiments of the present disclosure are briefly described hereinafter.

(i) According to the present disclosure, the normal pitch and the jumper pitch are used alternately at a certain interval, and the first pitch and the second pitch are used at intervals for the normal pitch, so that the windings are more evenly wound in the circumferential direction C of the stator core, and the alternating current resistances are more balanced.

(ii) The magnetic potential at the jumper pitch has fewer harmonic components, and the performance of the motor is excellent.

(iii) The wires are continuously wound in undulation, which greatly reduces the number of welding spots and increases the reliability of the windings.

It should be understood that the above-mentioned embodiments are exemplary only and are not intended to limit the present disclosure. Those skilled in the art can make various modifications and changes to the above-mentioned embodiments according to the teaching of the present disclosure without departing from the scope of the present disclosure.

The invention claimed is:

1. A stator of a motor, the stator comprising:
    a stator core and a stator winding;
    the stator winding comprises a plurality of phase windings wound around the stator core, wires of the windings are continuously wound in undulation in a circumferential direction of the stator core, the wires are wound for 2N layers, a number of phases of the phase windings is S, a number of poles of each phase winding is 2P, and N, S and P are positive integers, wherein
    4×S×P slots are defined in the stator core, the winding of each said pole of each of the phases comprises two wire groups, and each of the wire groups comprises two wires wound in parallel in adjacent ones of the slots;
    pitches of the wire groups during winding comprise a normal pitch and a jumper pitch, the normal pitch comprises a first pitch and a second pitch which alternate, the first pitch is y+1, the second pitch is y−1, the jumper pitch comprises a third pitch and a fourth pitch, the third pitch is y, the fourth pitch is y−2, and y is a positive integer greater than 2; and
    for each of the wire groups, one of the jumper pitches is used after every P−1 of the normal pitches in a same one of the layers, and the jumper pitch enables the two wires in the same wire group to exchange sequence in a winding direction along the circumferential direction.

2. The stator according to claim 1, wherein for each of the wire groups, one of the jumper pitches is used between two of the normal pitches at a junction of any adjacent ones of the layers except an Nth layer and an (N+1)th layer, so that the two wires in the same wire group exchange sequence in the winding direction along the circumferential direction.

3. The stator according to claim 1, wherein for each of the wire groups, one of the jumper pitches is used between two of the normal pitches at a junction of any adjacent ones of the layers, so that the two wires in the same wire group exchange sequence in the winding direction along the circumferential direction.

4. The stator according to claim 2, wherein in the winding direction along the circumferential direction, the jumper pitch used by the wire in the slot which is a front one of the slots in the winding direction is the fourth pitch, and the jumper pitch used by the wire in the slot which is a rear one of the slots in the winding direction is the third pitch.

5. The stator according to claim 1, wherein y is equal to a pole pitch.

6. The stator according to claim 1, wherein the value S of the number of phases is equal to 3.

7. The stator according to claim 1, wherein the number of poles is 8, and P=4.

8. The stator according to claim 1, wherein the number of layers is 4, and N=2.

9. The stator according to claim 1, wherein each of the wires is an intact wire with no intermediate connection point in a winding path.

10. The stator according to claim 1, wherein the wires are flat wires.

11. A motor, comprising the stator according to claim 1.

12. A stator of a motor, the stator comprising:

a stator core and a stator winding;

the stator winding comprises a plurality of phase windings wound around the stator core, wires of the windings are continuously wound in a circumferential direction of the stator core, the wires are wound for 2N layers, a number of phases of the phase windings is S, a number of poles of each phase winding is 2P, and N, S and P are positive integers, wherein $4 \times S \times P$ slots are defined in the stator core, the winding of each said pole of each of the phases comprises two wire groups, and each of the wire groups comprises two wires wound in parallel in adjacent ones of the slots;

pitches of the wire groups during winding comprise a normal pitch and a jumper pitch, the normal pitch comprises a first pitch and a second pitch which alternate, the first pitch is $y+1$, the second pitch is $y-1$, the jumper pitch comprises a third pitch and a fourth pitch, the third pitch is $y$, the fourth pitch is $y-2$, and $y$ is a positive integer greater than 2; and for each of the wire groups, one of the jumper pitches is used after every $P-1$ of the normal pitches in a same one of the layers, such that the two wires in the same wire group exchange sequence in a winding direction along the circumferential direction.

13. The stator according to claim 12, wherein for each of the wire groups, one of the jumper pitches is used between two of the normal pitches at a junction of any adjacent ones of the layers except an Nth layer and an (N+1)th layer, so that the two wires in the same wire group exchange sequence in the winding direction along the circumferential direction.

14. The stator according to claim 12, wherein for each of the wire groups, one of the jumper pitches is used between two of the normal pitches at a junction of any adjacent ones of the layers, so that the two wires in the same wire group exchange sequence in the winding direction along the circumferential direction.

15. The stator according to claim 14, wherein in the winding direction along the circumferential direction, the jumper pitch used by the wire in the slot which is a front one of the slots in the winding direction is the fourth pitch, and the jumper pitch used by the wire in the slot which is a rear one of the slots in the winding direction is the third pitch.

16. The stator according to claim 12, wherein y is equal to a pole pitch.

17. The stator according to claim 12, wherein the value S of the number of phases is equal to 3.

18. The stator according to claim 12, wherein the number of poles is 8, and P=4.

19. The stator according to claim 12, wherein the number of layers is 4, and N=2.

20. The stator according to claim 12, wherein the wires are flat wires.

* * * * *